United States Patent
Ibe et al.

(10) Patent No.: US 10,711,332 B2
(45) Date of Patent: Jul. 14, 2020

(54) ADDITIVE MANUFACTURING MATERIAL FOR POWDER RAPID PROTOTYPING MANUFACTURING

(71) Applicant: FUJIMI INCORPORATED, Kiyosu-shi, Aichi (JP)

(72) Inventors: Hiroyuki Ibe, Kiyosu (JP); Junya Yamada, Kiyosu (JP)

(73) Assignee: FUJIMI INCORPORATED, Kiyosu-Shi (JP)

( * ) Notice: Subject to any disclaimer, the term of this patent is extended or adjusted under 35 U.S.C. 154(b) by 0 days.

(21) Appl. No.: 16/064,749

(22) PCT Filed: Dec. 20, 2016

(86) PCT No.: PCT/JP2016/087984
§ 371 (c)(1),
(2) Date: Jun. 21, 2018

(87) PCT Pub. No.: WO2017/110827
PCT Pub. Date: Jun. 29, 2017

(65) Prior Publication Data
US 2019/0003019 A1    Jan. 3, 2019

(30) Foreign Application Priority Data
Dec. 22, 2015  (JP) ................. 2015-250694

(51) Int. Cl.
*C22C 29/08* (2006.01)
*B33Y 70/00* (2020.01)
(Continued)

(52) U.S. Cl.
CPC ............ *C22C 29/08* (2013.01); *B22F 3/1055* (2013.01); *B23K 26/0006* (2013.01);
(Continued)

(58) Field of Classification Search
None
See application file for complete search history.

(56) References Cited

U.S. PATENT DOCUMENTS

2002/0136894 A1    9/2002  Itsukaichi et al.
2012/0282469 A1*  11/2012  Nahas ................ C04B 35/111
                                                                    428/402
(Continued)

FOREIGN PATENT DOCUMENTS

JP    2002-220652 A    8/2002
JP    2015-135099 A    7/2015
(Continued)

OTHER PUBLICATIONS

S. Kumar, "Manufacturing of WG-Go using SLS machine", Elsevier, Journal of Materials Processing Technology, 209, Apr. 21, 2009, pp. 3840-3848.
(Continued)

*Primary Examiner* — Ronak C Patel
(74) *Attorney, Agent, or Firm* — Foley & Lardner LLP

(57) ABSTRACT

A material for shaping is provided, with which it is possible to more effectively shape a shaped article that has high density while containing a ceramic. The present invention provides a material for shaping in order for use in powder additive manufacturing. This material for shaping includes a first powder that is a granulated powder containing a ceramic, and a second powder containing a metal. The second powder constitutes 10-90% by mass (exclusive) of the total of the first powder and the second powder.

1 Claim, 2 Drawing Sheets

(51) Int. Cl.
*B28B 1/00* (2006.01)
*B33Y 30/00* (2015.01)
*C22C 32/00* (2006.01)
*B23K 26/00* (2014.01)
*B23K 26/342* (2014.01)
*B33Y 80/00* (2015.01)
*B33Y 10/00* (2015.01)
*C22C 1/05* (2006.01)
*B22F 3/105* (2006.01)
*B22F 1/00* (2006.01)

(52) U.S. Cl.
CPC .......... *B23K 26/342* (2015.10); *B28B 1/001* (2013.01); *B33Y 10/00* (2014.12); *B33Y 30/00* (2014.12); *B33Y 70/00* (2014.12); *B33Y 80/00* (2014.12); *C22C 1/05* (2013.01); *C22C 32/00* (2013.01); *B22F 1/0011* (2013.01); *Y02P 10/295* (2015.11)

(56) References Cited

U.S. PATENT DOCUMENTS

| | | | | |
|---|---|---|---|---|
| 2015/0034604 | A1* | 2/2015 | Subramanian | B22F 7/02 219/73.21 |
| 2015/0089881 | A1* | 4/2015 | Stevenson | C09K 3/1409 51/309 |
| 2015/0147572 | A1* | 5/2015 | Sato | B22F 1/00 428/402 |

FOREIGN PATENT DOCUMENTS

| | | |
|---|---|---|
| JP | 2017-519101 A | 7/2017 |
| WO | WO 2015-162206 A2 | 10/2015 |

OTHER PUBLICATIONS

Kyogoku et al., Report of Kindai University Fundamental Technology for Next Generation Research Institute, ISSN 2185-8802, vol. 2, Jun. 2011, pp. 95-100.

Tsuyoshi Itsukaichi, "Thermal Spray Powders—Cermet-", Denkiseiko vol. 74, No. 4, Oct. 15, 2003, pp. 259-265.

Kuroda et al., "Structure and Properties of Thermal Sprayed Cermet (WC—Co) Coatings", Journal of High Temperature Society, ISSN 0387-1096, vol. 36, No. 6, Nov. 20, 2010, pp. 254-263.

Seiji Hayano, "Important Issues Regarding Powder Sintering Additive Manufacturing Devices", Sokeizai, vol. 48, No. 7, Jul. 20, 2007, pp. 6-12.

Sanyo Technical Report, "Gas Atomized Powder for Additive manufacturing", vol. 22, No. 1, Jun. 17, 2015, pp. 62-64.

Gu et al., "Influence of reinforcement weight fraction on microstructure and properties of submicron WC—Cop/Cu bulk MMCs prepared by direct laser sintering", Elsevier, Journal of Alloys and Compounds, vol. 431, 2007, Jun. 15, 2006, pp. 112-120.

Xiong et al., "(Ti, W)C—Ni cermets by laser engineered net shaping", Powder Metallurgy, vol. 53, No. 1, Mar. 2010, pp. 41-46.

Picas J A et al: "Microstructure and wear resistance of WC—Co by three consolidation processing techniques", International Journal of Refractory Metals and Hard Materials, Elsevier, Amsterdam, NL, vol. 27, No. 2, Mar. 1, 2009, pp. 344-349.

Office Action received in corresponding European application No. 16878716.6 dated Apr. 16, 2020.

* cited by examiner

ADDITIVE MANUFACTURING MATERIAL FOR POWDER RAPID PROTOTYPING MANUFACTURING

TECHNICAL FIELD

The present invention relates to an additive manufacturing material for powder rapid prototyping manufacturing. The present application claims priority to Japanese Patent Application No. 2015-250694 filed on 22 Dec. 2015, the entire content of which is entirely incorporated herein by reference.

BACKGROUND ART

Additive manufacturing technique is to adhere materials to produce articles based on numerical representations (typically 3D CAD data) of three-dimensional shapes. Typically, additive manufacturing materials are bonded or sintered as a thin layer having a shape corresponding to a cross-section of an article to be manufactured and the thin layers are stacked, thereby manufacturing a desired three-dimensional shape. In additive manufacturing, resin products have been widely manufactured from resin materials because the handling thereof is easy. However, an improvement in powder rapid prototyping manufacturing (powder lamination) technique is recently sought which allows direct manufacturing of metal or cermet parts from powder materials containing metals and cermets without requiring moulds (for example, see Patent Literature 1 and 2).

CITATION LIST

Non Patent Literature

Non Patent Literature 1: S. Kumar, J. MATER. PROCESS. TECHNOL 209 (2009) 3840-3848
Non Patent Literature 2: Reports from Kinki University Research Institute of Fundamental Technology for Next Generation, Vol. 2 (2011) 95-100

SUMMARY OF INVENTION

Technical Problem

Such powder materials containing cermets generally have high melting point and mechanical strength compared to metal materials and resin materials, and thus it is difficult to control bonding of particles that form powder. Therefore, in order to obtain manufactured articles with high quality, it is important to adjust properties of powder materials. For example, it is required for powder for lamination manufacturing to have uniform grain size and be formed with particles which are approximately true spheres and have low porosity (less pores) therein. However, articles manufactured with such conventional powder materials have issues of the relative density of less than 100% because voids are inevitable between particles that form the powder.

Specifically, when, for example, a metal part for which high relative density is not required in the whole region is manufactured by powder rapid prototyping manufacturing, the core in the metal part, for example, is manufactured to have low density and the shell at the surface is manufactured to have high density. In this case, the core having low density, for example, is manufactured with a heat source of a high-power laser so that the laminated thickness per scan is relatively high (such as about 90 μm) while the shell portion having high density is manufactured with a relatively low-power laser so that the laminated thickness per scan is low (such 30 μm or less).

Therefore, in manufacturing a part required to have high density even at the central part thereof, a thin laminate has to be repeatedly manufactured over an extremely long time. Alternative means include increasing the relative density by infiltrating bronze into a porous manufactured article or increasing laser absorbance by coating a powder material with a laser absorbent.

The above problem may be more significant in manufacturing of parts containing ceramics generally having higher melting points than metals. Thus, at present, the relative density of powder rapid prototyping manufactured articles containing ceramics, for example, can does not reach approximately 90% even when various manufacturing conditions and properties of powder materials are strictly adjusted.

With the foregoing in view, an object of the present invention is to provide a novel powder-shaped additive manufacturing material for powder rapid prototyping manufacturing that contains ceramic while allowing more efficient manufacturing of articles with high density.

Solution to Problem

In order to solve the above problem, the technique described herein provides an additive manufacturing material for powder rapid prototyping manufacturing. The additive manufacturing material contains a first powder that is a granulated powder containing a ceramic and a second powder containing a metal. It is characterised in that a proportion of the second powder relative to a sum of the first powder and the second powder is above 10% by mass and less than 90% by mass.

It has been commonly understood that one of the important requirements for conventional powder-shaped additive manufacturing materials is low porosity (less pores) also for the additive manufacturing material in order to avoid formation of pores in manufactured articles. In contrast, the material described herein is configured to contain a ceramic component in the form of granulated powder. In other words, the first powder contains the ceramic component as, for example, primary particles. The first powder is also in the form of secondary particles in which the primary particles are bound. Voids may exist between primary particles. Because of such a shape of the first powder, the additive manufacturing material is easily melted even when the material contains a ceramic, allowing manufacturing of dense manufactured articles. Alternatively, the second particles containing a metal may melt with less energy to promote melting of the first powder. Alternatively, the second particles containing a metal are melted and suitably wet and spread in voids of the first powder containing a ceramic. As a result of this, dense manufactured articles may be manufactured. For example, dense manufactured articles may be manufactured without a need for reduction of the laser scanning speed.

In a preferable embodiment of the technique described herein, the first powder has an average particle diameter of 1 μm or more and 100 μm or less. As a result of this, the additive manufacturing material having properties suitable for manufacturing machines in general use is provided.

In a preferable embodiment of the technique described herein, the second powder has an average particle diameter of 0.1 μm or more and 100 μm or less. As a result of this, the additive manufacturing material that is more easily melted during manufacturing and allows manufacturing of dense manufactured articles is provided. For example, the additive manufacturing material is provided that allows manufacturing of dense manufactured articles without a need for reduction of the laser scanning speed.

In a preferable embodiment of the technique described herein, the first powder is granulated powder obtained by granulating a powder formed from the ceramic and a powder formed from a second metal. As a result of this, the second metal may easily wet and spread between the powder formed from the ceramic in the first powder and the second metal may suitably serve as a binder for the powder formed from the ceramic, and thus it is preferable. In addition, for example, a manufactured article containing a cermet may be suitably manufactured.

In a preferable embodiment of the technique described herein, the primary particles that form the granulated powder in the first powder are combined by sintering. As a result of this, scattering of powder may be suitably prevented and a reduction of manufacturing rate may be suppressed even when manufacturing is performed with, for example, a high-power laser.

The additive manufacturing material contains a ceramic as a constituent, and the ceramic is contained in the additive manufacturing material in the form of primary particles that form granulated powder. Therefore, it is possible to manufacture dense manufactured articles by powder rapid prototyping manufacturing under common conditions. From such viewpoints, the technique described herein also provides a three-dimensional manufactured article of the additive manufacturing material.

In another aspect, the technique described herein also provides a method for manufacturing a three-dimensional manufactured article characterised in that the additive manufacturing material is used for three-dimensional manufacturing.

DESCRIPTION OF EMBODIMENTS

Figure 1:
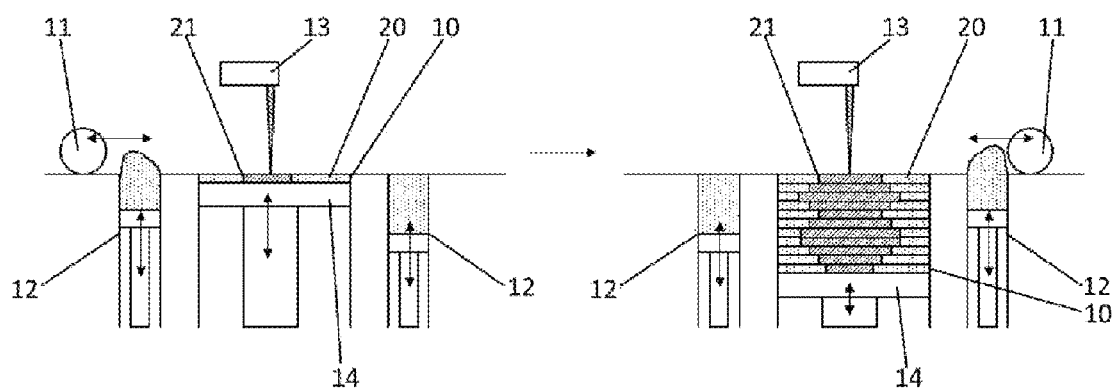
FIG. 1 is a schematic cross-sectional view illustrating a machine on which powder rapid prototyping manufacturing is performed.

Preferable embodiments of the present invention are described hereinafter. The matters that are necessary for practise of the present invention and are other than those specifically described in the present specification are understood and practised by a person skilled in the art on the basis of the teachings on practise of the invention described herein and common technical knowledge as of filing in the art. The dimensional ratios in the drawings are exaggerated for convenience of description and may be different from actual ratios. As used herein, the term "X to Y" indicating a range means "X or more and Y or less", and the terms "weight" and "mass", "% by weight" and "% by mass" and "part(s) by weight" and "part(s) by mass" are respectively interchangeably used.

(Additive Manufacturing Material)

The "additive manufacturing material" described herein is a powder-shaped material for powder rapid prototyping manufacturing. The term "powder rapid prototyping manufacturing" broadly encompasses various manufacturing processes using powder-shaped materials as materials of manufactured articles in the art of additive manufacturing. The powder rapid prototyping manufacturing specifically encompasses, for example, methods referred to as binder jetting, directed energy deposition typically including laser clad welding, electron beam clad welding and arc welding, powder bed fusion typically including laser sintering, selective laser sintering (SLS) and electron beam sintering. It is particularly preferable that the additive manufacturing material described herein is used for directed energy deposition and powder bed fusion from the viewpoint that the material is suitable for manufacturing of dense manufactured articles.

The additive manufacturing material described herein contains a first powder that is granulated powder containing a ceramic and a second powder containing a metal. The first powder and the second powder may be present in a mixed state. Suitably, the first powder and the second powder are uniformly mixed.

(First Powder)

The first powder substantially contains a ceramic. The first powder typically contains a ceramic as a main component. The term main component in this context means a component that accounts for 60% by mass or more of the first powder. Preferably 70% by mass or more, more preferably 75% by mass or more and particularly preferably 80% by mass or more (typically 90% by mass or more) of the first powder is formed with ceramic. The first powder is in the form of granulated particles. When the first powder contains a component other than the ceramic, the component may be a resin, an inorganic material other than the ceramic or a metal. The component other than the ceramic is not particularly limited and may be, for example, the metal component described hereinbelow. The component other than the ceramic may form the granulated powder together with the ceramic.

The ceramic in the first powder exists as primary particles, and the primary particles are three-dimensionally bound together to form granulated particles (and thus granulated powder). It may be understood that the ceramic component forms at least a part of secondary particles. In such an additive manufacturing material, primary particles may be desorbed from granulated particles. Therefore, it goes without saying that the ceramic (such as 10% by mass or less) may exist in the form of single particle rather than in the form of granulated powder.

The ceramic may be, for example, a ceramic material formed from any metal oxide (oxide ceramic) or a ceramic material formed from a non-oxide such as a carbide, a boride, a nitride and apatite.

The oxide ceramic may be any metal oxide without particular limitation. The metal element that forms the oxide ceramic may be one or two or more selected from metalloid elements such as boron (B), silicon (Si), germanium (Ge), antimony (Sb) and bismuth (Bi); representative elements such as magnesium (Mg), calcium (Ca), strontium (Sr), barium (Ba), zinc (Zn), aluminium (Al), gallium (Ga), indium (In), tin (Sn) and lead (Pb); transition metal elements such as scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), manganese (Mn), iron (Fe), cobalt (Co), nickel (Ni), copper (Cu), silver (Ag) and gold (Au); and lanthanoid elements such as lanthanum (La), cerium (Ce), praseodymium (Pr), neodymium (Nd), samarium (Sm), europium (Er) and lutetium (Lu). Among others, it is preferable that the metal element is one or more elements selected from Mg, Y, Ti, Zr, Cr, Mn, Fe, Zn, Al and Er.

More specifically, examples of the oxide ceramic include alumina, zirconia, yttria, chromia, titania, cobaltite, magnesia, silica, calcia, ceria, ferrite, spinel, zircon, nickel oxide, silver oxide, copper oxide, zinc oxide, gallium oxide, strontium oxide, scandium oxide, samarium oxide, bismuth oxide, lanthanum oxide, lutetium oxide, hafnium oxide, vanadium oxide, niobium oxide, tungsten oxide, manganese oxides, tantalum oxide, terpium oxide, europium oxide, neodymium oxide, tin oxide, antimony oxide, antimony-containing tin oxide, indium oxide, tin-containing indium oxide, zirconium aluminate oxide, zirconium silicate oxide, hafnium aluminate oxide, hafnium silicate oxide, titanium silicate oxide, lanthanum silicate oxide, lanthanum aluminate oxide, yttrium silicate oxide, titanium silicate oxide, tantalum silicate oxide and the like.

Examples of the non-oxide ceramic include carbides such as tungsten carbide, chromium carbide, vanadium carbide, niobium carbide, molybdenum carbide, tantalum carbide, titanium carbide, zirconium carbide, hafnium carbide, silicon carbide and boron carbide; borides such as molybdenum boride, chromium boride, hafnium boride, zirconium boride, tantalum boride and titanium boride; nitrides such as boron nitride, titanium nitride, silicon nitride and aluminium nitride; complexes such as forsterite, steatite, cordierite, mullite, barium titanate, lead titanate, lead zirconate titanate, Mn—Zn ferrite, Ni—Zn ferrite and sialon; phosphate compounds such as hydroxyapatite and calcium phosphate; and the like.

The above ceramic may contain any element that is doped or substituted. The first powder may contain only one ceramic or two or more ceramics in combination. When the first powder contains two or more ceramics, some or all of the ceramics may form complexes. Examples of the complexed ceramics include, specifically, yttria-stabilised zirconia, partially stabilised zirconia, gadolinium-doped ceria, lanthanum-doped lead zirconate titanate and sialon and complexed oxides described above. With the first powder being formed from granular particles containing the ceramic, a manufactured article containing the ceramic may be manufactured.

(Granulated Powder)

The first powder is formed from granulated powder. In other words, the first powder is formed as an aggregate of granulated particles in the form of secondary particles as described above. The term "granulated particles" as used herein refers to a particle-like substance (showing the form of a particle) in which primary particles are three-dimensionally bound to be combined and behave as one particle. The term "binding" as used herein means two or more primary particles are linked directly or indirectly. The binding includes, for example, binding of primary particles through chemical reaction, binding of primary particles attracted by simple adsorption, binding that exploits an anchor effect of an adhesive material and the like filling the unevenness on the surface of primary particles, binding of primary particles that exploits an attractive effect by static electricity, binding of primary particles by fusion or sintering of the surfaces thereof resulting in combining, binding by a binder (adhesive) and the like.

Such a first powder may be attained as, for example, an aggregate of granular particles (sometimes also simply referred to as "granulated particles"), granulated sintered particles (hereinafter sometimes also simply referred to as "granulated sintered particles", in contrast to the granulated particles which are granular particles) in which individual particles that form granular particles (granulated particles) are sintered, coated fine particles comprising fine particles bound on the periphery of core particles or the like. From viewpoints of attaining the first powder particularly suitable for three-dimensional manufacturing having excellent flowability, it is preferable that the first powder is formed from granulated particles or granulated sintered particles. Further, the first powder is more preferably granulated sintered powder formed from granulated sintered particles because the first powder in the additive manufacturing material hardly collapses or is scattered even when even when irradiated with an energy source such as a laser with high intensity.

In such a first powder, there may be voids between particles (typically primary particles) that form the granulated powder. In addition, the surface of the granulated particles has unevenness which reflects the shape of primary particles. Because of this, the first powder is advantageous as it is prone to receive energy from an energy source (heat source) for manufacturing and is prone to be dissolved. Alternatively, it is advantageous because the second powder described hereinafter is dissolved and may easily penetrate between particles that form the first powder. As a result, voids in the granulated powder are easily eliminated and a dense manufactured article having a high degree of hardness that is close to a sintered compact (bulk material) produced by using, for example, a casting mould may be obtained. Although it is difficult to strictly define by a numerical value, such granulated particles may be clearly distinguished from spherical particles having smooth surfaces in terms of the appearance in the micro level.

(Average Particle Diameter of the First Powder)

The first powder may have any average particle diameter without particular limitation and may have a size that is suitable for the specification of, for example, a powder rapid prototyping manufacturing machine used. For example, the size may be suitable for supply of the additive manufacturing material during powder rapid prototyping manufacturing. The upper limit of the average particle diameter of the first powder may be, for example, above 100 μm when configuring the diameter to be higher. Typically, the upper limit may be 100 μm or less, preferably 75 μm or less, more preferably 50 μm or less and still more preferably 40 μm or less. When the first powder has a decreased average particle diameter, the filling rate of the first powder in, for example, the manufacturing area may increase. As a result, the density of the three-dimensional manufactured article may be suitably increased. In addition, the surface roughness (Ra) of the three-dimensional manufactured article may be decreased and an effect of improving dimension accuracy may also be obtained. Further, the additive manufacturing material of the present invention includes voids, and thus there is also an advantage of improving the solidification efficiency when the adhered additive manufacturing material is solidified during lamination manufacturing.

The lower limit of the average particle diameter of the first powder is not particularly limited as far as the flowability of the additive manufacturing material is not affected. The lower limit may be, but is not limited to, for example 10 μm or less, 5 μm or less and the like when configuring the diameter to be lower. However, as the first powder described herein has the form of granulated powder, and thus it is not always necessary to reduce the average particle diameter. Therefore, when the handling during formation of the additive manufacturing material and the flowability of the additive manufacturing material are taken into account, the lower limit of the average particle diameter of the first powder may be 1 μm or more, suitably 5 μm or more, preferably 10 μm or more and more preferably, for example, 20 μm or more.

When the first powder has an increased average particle diameter, the additive manufacturing material may have increased flowability. As a result, the additive manufacturing material may be preferably supplied to a manufacturing machine and the prepared three-dimensional manufactured article may have a preferable finish, and thus it is preferable.

Generally, fine powder materials having an average particle diameter of, for example, less than about 10 μm have difficulty in control of the particle shape and have increased specific surface area, and thus have decreased flowability. Therefore, when such a powder material is used for powder rapid prototyping manufacturing, it may often be difficult to planarize the powder material during supply thereof. Further, the powder material scatters due to the small mass thereof, and thus handling thereof may be difficult. In contrast, in the additive manufacturing material described herein, the first powder is formed with granulated powder in which more than one primary particle having a small average particle diameter is three-dimensionally bound. As a result of this, it is possible to increase the weight while maintaining the form of primary particles. In addition, as described above, the concentration of components in the additive manufacturing material may be kept uniform even though the additive manufacturing material contains the first powder and the second powder having different composition from the first powder. As a result of this, it is possible to provide a novel additive manufacturing material for powder rapid prototyping manufacturing that has both advantages resulting from using secondary particles having low average particle diameter and using secondary particles having high average particle diameter.

(Average Particle Diameter of Primary Particles)

In the additive manufacturing material described herein, the primary particles that form granulated particles (secondary particles) in the first powder preferably have an average particle diameter of, for example, 20 μm or less (less than 20 μm), more preferably 10 μm or less (less than 10 μm) and for example 10 μm or less. By reducing the average particle diameter of primary particles, it is possible to prepare a denser and finer three-dimensional manufactured article. The primary particles of the first powder may have an average particle diameter of, for example, 1 nm or more, more preferably 200 nm or more, and for example 500 nm or more. By reducing the average particle diameter of primary particles, it is possible to prepare a denser and finer three-dimensional manufactured article.

Moreover, the powder material conventionally used for powder rapid prototyping manufacturing having a small average particle diameter (such as 20 μm or less) tends to have an increased resistance to flow and thus a decreased flowability because of an increased impact by the contact area between particles that form powder. In contrast, in the first powder of the additive manufacturing material described herein, the primary particles, even if they have a low average particle diameter, form the additive manufacturing material in the form of secondary particles, and thus the first powder may have preferable flowability according to the average particle diameter of secondary particles.

The first powder may have voids between primary particles that form secondary particles. The term "void" in this context means a space that is larger than a space that is inevitably formed when, for example, primary particles are close-packed. The "void" may be a space that is 1.1 times (typically 1.2 times) or more of a space that is inevitably formed when primary particles are close-packed. The void may be observed with, for example, a specific surface area and pore distribution analyser and the like.

By configuring the average particle diameter of the primary particles in the first powder to be minute, the first powder containing a ceramic may be, for example, softened or melted at a temperature lower than the melting point of the ceramic per se. This is a completely new finding that has not been predicted. Thus, the additive manufacturing material containing such a first powder may be softened or melted with, for example, a lower laser output than that was conventionally required in powder rapid prototyping manufacturing, enabling a reduction of the process cost. In addition, because of an increased softening or melting efficiency of secondary particles, a dense three-dimensional manufactured article having low porosity may be prepared. As a result of this, a three-dimensional manufactured article that has properties close to, for example, a bulk of the additive manufacturing material or a ceramic material may be prepared.

The "average particle diameter" of the additive manufacturing material, the first powder, and second powder to be described later used herein means, unless otherwise stated, a particle diameter at 50% of the cumulative value (50% volume average particle diameter; $D_{50}$) in the particle size distribution based on the volume as measured on a particle size distribution analyser based on the laser diffraction/scattering method. However, for a group of particles having an average particle diameter of, for example, less than 1 μm, the average particle diameter may be measured on the basis of the dynamic light scattering or electron microscopy. In this case, the average particle diameter as used herein is typically an arithmetic average of diameters corresponding to circles determined for planar view images (such as secondary electron images) of 100 or more particles observed by an observation means such as an electron microscope.

The "average particle diameter" of primary particles (which are bound together) that form the first powder may be, for example, a value calculated as a diameter (diameter corresponding to a sphere) of spherical particles calculated from the specific surface area. The average particle diameter of the primary particles (Dave) may be determined on the basis of the following equation: Dave=6/(ρSm), wherein Sm is the specific surface area and ρ is the density of the entire additive manufacturing material. The density ρ of the additive manufacturing material may be a value obtained by calculating an average composition of the entire first powder.

The specific surface area may be a value, for example, calculated according to the BET method from the amount of gas adsorbed such as $N_2$ measured according to the continuous flow method on a specific surface area analyser (produced by Micromeritics Instrument Corp., FlowSorb II 2300). The specific surface area may be measured according to the "Determination of the specific surface area of powders (solids) by gas adsorption-BET method" under JIS Z 8830: 2013 (ISO9277:2010).

<Specific Surface Area>

The specific surface area of the first powder is not particularly limited; however, it is preferably, for example, above 0.1 m²/g. Namely, it is preferable that the additive manufacturing material is mainly formed with secondary particles having a (extremely) high specific surface area. Specifically, as, for example, silica ($SiO_2$) has a specific gravity of 2.2 g/ml, a true sphere silica particle having a radius of r m has a specific surface area of $1.36/r \times 10^{-6}$ m²/g. Accordingly, for example, a true sphere silica particle having a radius of 30 μm has a specific surface area of 0.045 m²/g. Further, as a alumina ($Al_2O_3$) has a specific gravity of 3.98 g/ml, a true sphere alumina having a radius of r m has a specific surface area of $0.75/r \times 10^{-6}$ m$^2$/g. Accordingly, a true sphere alumina particle having a radius of 30 μm has a specific surface area of 0.025 m$^2$/g. In contrast, the first powder described herein preferably has a specific surface area of 0.1 m$^2$/g or more. Because of such an increased specific surface area, the additive manufacturing material described herein may have such a shape (structure) that the surface conformation is three-dimensionally intricate and complex. Namely, it is possible to significantly reduce the substantial dimension (such as the thickness of the surface unevenness) without being restrained by the average particle diameter of the additive manufacturing material per se. Accordingly, by having such an extremely high specific surface area, the first powder containing a ceramic having high melting point may effectively absorb the heat from a heat source of relatively low temperature such as a laser to achieve sufficient softening and melting. As a result, it is possible to provide an additive manufacturing material that allows efficient preparation of a three-dimensional manufactured article containing a ceramic.

Moreover, lamination may be achieved with heat at relatively low temperature, and thus lamination manufacturing at a temperature that may suppress grain growth may be achieved. In addition, the composition of the additive manufacturing material is hardly varied by heat even with secondary particles containing an element having a low melting point. Therefore, it is possible to conveniently control the composition of the prepared three-dimensional manufactured article. Thus, although the specific surface area of the secondary particles is not particularly limited, it is desirable that the specific surface area is high and is preferably 0.1 m$^2$/g or more.

<Compression Strength>

The lower limit of the compression strength of the granulated particles (secondary particles) that form the first powder is not limited in a narrow sense. For the additive manufacturing material for powder rapid prototyping manufacturing in which a heat source used is a laser, the compression strength is preferably in the range of the compression strength of granulated sintered ceramic particles for additive manufacturing materials. The compression strength of the secondary particles that form the additive manufacturing material is preferably 1 MPa or more, more preferably 10 MPa or more, still more preferably 100 MPa or more and particularly preferably 1000 MPa or more. When the granulated particles have an increased compression strength, the secondary particles that form the first powder may have an increased ability of shape retention and the secondary particles may be prevented from collapsing. As a result, the material powder may be stably supplied to the manufacturing area.

The upper limit of the compression strength of the granulated particles (secondary particles) that form the additive manufacturing material is not particularly limited as far as it is in the range of the compression strength of secondary particles used for general powder materials, and is preferably 3000 MPa or less, more preferably 2500 MPa or less and still more preferably 2000 MPa or less. When the secondary particles have a decreased compression strength, the manufacturing efficiency of the additive manufacturing material increases.

The "compression strength" of granulated particles that form the first powder as used herein may be the fracture strength measured on an electromagnetic force loading compression tester. Specifically, one granulated particle is fixed between a pressure indenter and a pressure plate and a compression load by electromagnetic force is applied with a constant increment between the pressure indenter and the pressure plate. Compression is performed with a constant loading rate and the displacement of the measurement sample is measured. By processing the result of the displacement property of the measured sample on a dedicated programme, the compression strength (fracture strength) of the granulated particle may be calculated. In the present specification, the compression strength of granulated particles may be an arithmetic average of fracture strengths measured on a micro compression testing machine (produced by Shimadzu Corporation, MCT-500). With respect to each granulated sintered particle, specifically, the compression strength σ [MPa] of the granulated sintered particle is calculated from the following equation: $\sigma = 2.8 \times L/\pi/d^2$, wherein L [N] represents the critical load obtained by the compression test and d [mm] represents the average particle diameter.

<Range of Grain Size>

It is preferable that the range of grain size of the first powder is appropriately selected according to the type of the machine and conditions used for powder rapid prototyping manufacturing. For example, specifically, the range of grain size of the first powder may be appropriately adjusted so as to be 5 to 20 μm, 45 to 150 μm, 5 to 75 μm, 32 to 75 μm, 15 to 45 μm, 20 to 63 μm or 25 to 75 μm.

The range of grain size of the first powder represents the size (particle diameter) and proportion (relative particle amount provided that the entire first powder is regarded as 100% by volume) of particles contained in the group of particles (namely group of granulated particles) that forms the first powder. The "range of grain size" is an index of the width (extent) from the lower limit to the upper limit of diameters of particles in the first powder. The lower limit of the range of grain size as used herein means that the proportion of particles having particle diameters at or lower than the value in the first powder is 5% or less. The upper limit of the range of grain size means that the proportion of particles having particle diameters at or above the value in the first powder is 5% or less. The grain size distribution of the first powder may be measured on a suitable grain size distribution analyser according to the grain size of the first powder. For example, the grain size distribution may be determined on, for example, a RO-TAP tester (see JIS R 6002) or an analyser employing laser diffraction/scattering. For example, the first powder having, for example, a range of grain size of 5 to 75 μm means that the proportion of particles having particle diameters of 5 μm or less is 5% or less and the proportion of particles having particle diameters of 75 μm or more is 5% or less.

<Circularity>

It is further preferable that the granulated particles (secondary particles) that form the first powder have an average circularity of less than 1.5 (such as 1 or more and less than 1.5). The average circularity is employed as an index that may indirectly represent an average sphericity of secondary particles that form the first powder and means an average circularity when the secondary particles are viewed as a plane from an arbitrary direction. Therefore, the average circularity does not necessarily intend to mean that the secondary particles are close to a two-dimensional true circle but intends to mean that the secondary particles are substantially close to a three-dimensional true sphere.

Particularly, the first powder contains a ceramic. Generally, a ceramic without spheroidization treatment has high crystallinity and thus tends to provide the shape of particles that is the same as the external shape of the crystal system.

Among others, ceramic particles which are a ground material have strong tendency as above because the particles are crushed along the crystal planes. In addition, ceramic particles can, even when the particles do not exhibit the external shape of the ideal crystal system, exhibit the shape close to polyhedrons which are combinations of specific crystal planes as an external shape thereof. Therefore, when particles containing a ceramic that has edges, corners (which may be vertices) and angular parts originating from the crystal system is used as it is, the flowability tends to decrease. Namely, secondary particles containing a ceramic may interlock each other during supply to the manufacturing area to make planarization difficult.

In contrast, the first powder is in the form of granulated particles, and thus the external shape is close to a true sphere and thus there is less effect by, for example, crystal planes, edges, corners or angular parts that reflect the crystallinity of the ceramic that forms the particles. As a result of this, the first powder, and thus the entire additive manufacturing material may have a significantly increased flowability even though the first powder contains a ceramic. In other words, in the first powder described herein, the primary particles containing a ceramic may be in the form to which high crystallinity of the ceramic is reflected, and may have, for example, the external shape of prism or mass. High flowability may be secured if the granulated particles satisfy the above average circularity. The average circularity may be an index that may reflect the average sphericity that may not be represented by an index such as the average aspect ratio. Accordingly, in a planarization step of powder rapid prototyping manufacturing, the flowability is increased. The average circularity of the additive manufacturing material is preferably as close to 1 as possible and may be 1 or more. The average circularity is preferably 2.7 or less, more preferably 2.0 or less, 1.5 or less and may be, for example, 1.2 or less.

The "circularity" of the granulated particles that form the first powder as used herein means an arithmetic average of circularities determined for planar view images (such as secondary electron images) of 100 or more granulated particles (secondary particles) observed by an observation means such as an electron microscope. The circularity is defined according to the following equation based on the boundary length which corresponds to the length of the contour of a secondary particle and the area surrounded by the contour in the planar view image of the secondary particle. The circularity is an index that tends to reflect the surface shape smoothness of secondary particles, and geometrical circle (true circle) has a circularity of 1 and as the shape departs from true circle, the circularity becomes higher than 1. The average circularity may be determined by, for example, analysing an electron microscopic image obtained at an appropriate magnification on an image processing software or the like.

Circularity=(Boundary length)/(4×π×Area)

<Aspect Ratio>

With regard to the external shape of the granulated particles (secondary particles) that form the first powder, it is more preferable that the average aspect ratio in the planar view is less than 1.4. As described above, in secondary particles having an average circularity closer to 1, the circularity may reflect the surface shape rather than the shape of the whole secondary particles. In other words, when evaluating secondary particles close to a true circle, the circularity tends to increase beyond the extent of change in the external shape of whole secondary particles if the contour of the secondary particle in the planar view becomes complicated at the micro level. Therefore, by defining the external shape of secondary particles by the aspect ratio in addition to the circularity, secondary particles may be obtained of which external shape as a whole is close to a true sphere, namely close to a true circle in the planar view.

The average aspect ratio is, by taking the flowability of the first powder into account, preferably 1.5 or less and more preferably 1.3 or less. The average aspect ratio may be, for example, 1.15 or less and desirably 1 or close to 1.

The "aspect ratio" as used herein means an arithmetic average of aspect ratios determined for planar view images (such as secondary electron images) of 100 or more granulated particles (secondary particles) that form the first powder, as observed by an observation means such as an electron microscope. The aspect ratio may be defined by a/b, wherein a is the length of the long axis and b is the length of the short axis of the ellipse corresponding to the secondary particle. The ellipse corresponding to the secondary particle means an ellipse that has the same area and the same first-order and second-order moments as the secondary particle. The average aspect ratio may be determined by, for example, analysing an electron microscopic image obtained at an appropriate magnification on an image processing software or the like.

<Fractal Dimension>

It is also a preferable embodiment in which the granulated particles (secondary particles) that form the first powder have an average fractal dimension of less than 1.5. Such secondary particles may have surface shapes that are complex at the micro level. Therefore, by defining the complex surface shape of the particles by a variety of indices, the granulated particles may be obtained of which external shape is further close to a true sphere. The fractal dimension is an index that is widely and generally used in order to measure a complex surface shape of each particle, and the average fractal dimension may be a suitable index for measuring the surface smoothness of the first powder described herein. By defining the average fractal dimension to be less than 1.5, the first powder, and thus the additive manufacturing material having a further improved flowability may be attained. The average fractal dimension is preferably 1.1 or less and more preferably 1.05 or less when the flowability of the first powder (and thus the additive manufacturing material) is taken into account.

The "fractal dimension" as used herein means an arithmetic average of fractal dimensions determined for planar view images (such as secondary electron images) of 100 or more granulated particles observed by an observation means such as an electron microscope. The fractal dimension as used herein is a value determined according to the divider method and is defined as a slope of a linear portion of the function connecting the boundary length and logarithm of the stride length of a secondary particle in a planar view image of the secondary particle. The measured value of the fractal dimension is a value of 1 (=solid line) or more and less than 2 (=plane) and the value closer to 1 means that the secondary particle has a smoother surface. The average fractal dimension may be determined by, for example, analysing an electron microscopic image obtained at an appropriate magnification on an image processing software or the like.

<Repose Angle>

It is also a preferable embodiment in which the first powder described herein has a repose angle of less than 39 degrees. The repose angle is one of the indices that have been conventionally and widely used to represent the flowability of powder. The repose angle may also be an index that may practically reflect spontaneous flowability during, for example, transport of the first powder through a supplying machine and a manufacturing machine. Therefore, by defining the repose angle to be low, the first powder (and thus the additive manufacturing material) having high flowability may be attained. As a result of this, the additive manufacturing material may allow preparation of a homogeneous three-dimensional manufactured article with preferable productivity.

The repose angle is preferably 36 degrees or less and more preferably 32 degrees or less when the flowability of the first powder (and thus the additive manufacturing material) is taken into account. The repose angle may further be, for example, 30 degrees or less. The lower limit of the repose angle is not particularly limited. However, when the repose angle is too low, the first powder may easily be scattered or the control of the supply quantity of the first powder may be difficult. Therefore, the repose angle of 20 degrees or more may be exemplified as an approximate target.

<Flow Function>

Without particular limitation, it is preferable that the first powder described herein has a flow function of 5.5 or more.

The above repose angle is an index that allows evaluation of flowability of the first powder under no load. In contrast, the flow function is to evaluate the flowability of the first powder by measuring the shear stress while sealing and pressurising the first powder and may be an index that may practically represent the handleability of the first powder (and thus the additive manufacturing material). Therefore, according to the above configuration, the first powder having an average particle diameter of, for example, less than 30 µm may be considered to have high flowability, and the first powder (and thus the additive manufacturing material) that allows preparation of a three-dimensional manufactured article with higher productivity may be provided.

(Second Powder)

The second powder substantially contains a metal. The second powder typically contains a metal as a main component. The term main component in this context means a component that accounts for 70% by mass or more of the second powder. Preferably 80% by mass or more, more preferably 90% by mass or more and particularly preferably 95% by mass or more (typically 98% by mass or more) of the second powder is formed with metal.

The metal is not particularly limited and may be, for example, any elemental substance of metal elements mentioned above as structural elements of the ceramic or an alloy of the element and one or more other elements. Examples of the metal elemental substance typically include magnesium (Mg), aluminium (Al), titanium (Ti), chromium (Cr), manganese (Mn), iron (Fe), cobalt (Co), nickel (Ni), copper (Cu), zinc (Zn), zirconium (Zr), gold (Au), silver (Ag), platinum (Pt), iridium (Ir), bismuth (Bi), niobium (Ni), molybdenum (Mo), tin (Sn), tungsten (W) and lead (Pb).

Examples of the alloy include copper alloys typically including Cu—Al alloy, Cu—Al—Fe alloy, Cu—Ni alloy and Cu—Ni—In alloy; nickel alloys typically including Ni—Al alloy, Ni—Cr alloy (such as Ni-20Cr alloy, Ni-50Cr alloy and Inconel), Ni—Cr—Fe alloy (such as Incoloy), Ni—Cr—Al alloy, Hastelloy (Ni—Fe—Mo alloy, Ni—Cr—Mo alloy) and Ni—Cu alloy (such Monel); cobalt alloys containing cobalt as a main component and typically including Co—Cr—W alloy (such as Stellite), Co—Cr—Ni—W—C alloy, Co—Mo—Cr—Si alloy and Co—Cr—Al—Y alloy; Ni self-fluxing alloys typically including Ni—Cr—Fe—Si—B—C alloy and Ni—Cr—Mo—Cu—Fe—Si—B—C alloy; Co self-fluxing alloys typically including Co—Ni—Cr—Mo—Fe—Si—B—C; low-carbon steels typically including martensite-age hardened steel; carbon steels; stainless steels typically including SUS304, SUS316, SUS410, SUS420J2 and SUS431; titanium alloys typically including Ti-6Al-4V; and the like. The term alloy as used herein means to encompass substances that are formed from the above metal element and one or more other elements and exhibit metallic properties, and the way of mixing thereof may be any of solid solution, intermetallic compound and mixtures thereof.

The second powder may contain any one metal or alloy mentioned above or two or more thereof in combination.

The second powder may have any average particle diameter without particular limitation. For example, in order to allow uniform mixing, the second powder may have a similar average particle diameter to the first powder. The second powder preferably has an average particle diameter of, for example, 100 µm or less, more preferably 50 µm or less and for example 10 µm or less. The second powder may have an average particle diameter of, for example, 1 nm or more, preferably 100 nm or more, more preferably 500 nm or more and for example 1 µm or more. From the viewpoint of forming an additive manufacturing material that is more suitable for lamination powder manufacturing, it is preferable that the average particle diameter $D_2$ of the second powder is lower than the average particle diameter $D_1$ of the first powder. The average particle diameter $D_1$ of the first powder and the average particle diameter $D_2$ of the second powder preferably fulfil, for example, $D_1 > D_2$, more preferably $D_2 \leq 0.7 \times D_1$ and particularly preferably $D_2 \leq 0.5 \times D_1$ without limitation. For example, $D_2 \leq 0.4 \times D_1$ may be configured. Alternatively, the average particle diameter $D_1$ of the first powder and the average particle diameter $D_2$ of the second powder may be preferably such that $0.05 \times D_1 \leq D_2$, more preferably $0.07 \times D_1 \leq D_2$ and particularly preferably $0.1 \times D_1 \leq D_2$.

The additive manufacturing material having the above structures contains not only the first powder which is granulated powder containing a ceramic but also the second powder containing a metal. Metals have a melting point generally lower than ceramics. As a result of this, in the additive manufacturing material, melting of the second powder precedes melting of the first powder, and the molten liquid of the second powder wet and spread on the surface of the first powder, thereby promoting melting of the first powder. Alternatively, the second powder may incorporate the first powder dispersed in the matrix obtained by melting the second powder, thereby providing a dense manufactured article containing the ceramic phase dispersed in the metal phase. For example, a dense manufactured article in the form of, for example, cermet or superalloy may be obtained.

The proportion of the second powder relative to the sum of the first powder and the second powder exceeds 10% by mass. As a result of this, the second powder may suitably wet and spread on the surface of the first powder of which sufficient melting is difficult, thereby allowing dense manufacturing. The proportion of the second powder may be appropriately adjusted according to the properties of the desired manufactured article. For example, the proportion is preferably 12% by mass or more, more preferably 15% by mass or more and particularly preferably 20% by mass or more. However, an extreme excess of the second powder is not preferable because the characteristics of the first powder containing a ceramic may be deteriorated. Therefore, the proportion of the second powder relative to the sum of the first powder and the second powder is defined to be less than 90% by mass. Although the proportion of the second powder may be appropriately adjusted according to the properties of the desired manufactured article, the proportion is preferably 85% by mass or less, more preferably 80% by mass or less and particularly preferably 75% by mass or less.

(Production Method of the Additive Manufacturing Material)

The additive manufacturing material according to the present embodiment may be prepared by mixing (blending) the first powder and the second powder. The second powder containing a metal may be metal powder having the above properties. The first powder containing a ceramic may be prepared from starting material powder which is ceramic powder (corresponding to primary particles) having the above properties by granulating or granulating/sintering the ceramic powder. The first powder may be commercially available first powder in the form of granulated powder. The production method of the first powder is not particularly limited as far as primary particles are in the form of three-dimensionally bound granulated particles. For example, productions of the additive manufacturing material by granulation method and granulation/sintering method are hereinafter described as suitable examples. However, the production method of the additive manufacturing material described herein is not limited thereto.

(Granulation Method)

The granulation method is a process for granulating starting material powder into the form of secondary particles. Any well-known various processes may be appropriately used as the granulation method. For example, the granulation method may be performed by using granulation method such as dry granulation and wet granulation. Specific examples include tumbling granulation, fluidized bed granulation, agitating granulation, crushing granulation, melt granulation, spray granulation, microemulsion granulation and the like. Among others, spray granulation is a suitable granulation method.

According to the spray granulation, the additive manufacturing material may be produced, for example, according to the following procedures. Thus, a starting material powder of the first powder having desired compositions and dimensions is first prepared. The starting material powder contains, as described above, at least ceramic powder. The surfaces of the starting material powder may be stabilised with a protecting agent and the like, if necessary. The thus stabilised starting material powder particles in the starting material powder are dispersed in an appropriate solvent together with, for example, a binder and optionally spacer particles containing an organic material and the like, thereby preparing a spray liquid. The starting material particles may be dispersed in the solvent by using, for example, a mixer or a dispersing machine such as a homogenizer and an agitator with blades. The spray liquid is then sprayed from an ultrasonic sprayer and the like to form droplets. The droplets on, for example, a gas flow are allowed to pass through a continuous oven to remove the solvent component and dry. Accordingly, the additive manufacturing material in which the first powder and the second powder are three-dimensionally bound together through voids may be obtained.

(Granulation/Sintering Method)

In the granulation/sintering method, the granulated powder as prepared above is baked in order to firmly bind (sinter) the starting material particles together. In the granulation/sintering method, droplets which are ultrasonically sprayed in the above granulation may be dried and then sintered while passing though the continuous oven on a gas flow. Specifically, while transporting the ultrasonically sprayed droplets through the continuous oven, the solvent component is removed by drying in a low-temperature zone provided at relatively upstream of the oven and then the droplets are sintered in a high-temperature zone provided at relatively downstream of the oven. The granulated starting material particles are sintered at mutual contact points and sintered while almost maintaining the granulated shape. The binder is eliminated during sintering. Accordingly, the additive manufacturing material formed from granulated sintered particles in the form of secondary particles in which primary particles are sintered may be obtained.

In the production process, granulated particles may be prepared by using spacer particles in addition to the starting material particles. When sprayed droplets are dried, the starting material particles and the binder are in the uniformly mixed state and the starting material particles are bonded by the binder to form mixed particles. Therefore, in the system in which spacer particles are used together with the starting material particles, the starting material particles and the spacer particles in the uniformly mixed state are bonded by the binder to form mixed particles. When the mixed particles are sintered, the binder (and the spacer particles) is eliminated (burns off) and the starting material particles are sintered. As a result of this, secondary particles in the form of primary particles bound through sufficient voids are formed.

Upon sintering, some of the starting material particles may form, depending on the composition or size thereof, a liquid phase to contribute to the binding with other particles. Therefore, primary particles may have a bigger average particle diameter than the starting material, namely starting material particles. Thus, primary particles in the additive manufacturing material, namely the first powder and the second powder may have almost the same dimensions and shapes as starting material particles or may be those obtained by growth/binding of starting material particles by sintering. For example, more than one starting material particle may be combined by sintering to form primary particles in the granulated particles. From drying to sintering, components other than starting material particles may be eliminated and the starting material particles may shrink due to sintering, and thus the obtained secondary particles may have a significantly smaller average particle diameter than droplets. The average particle diameters of the secondary particles and primary particles and the size and proportion of voids formed between the primary particles may be appropriately designed according to the form of desired secondary particles.

In the production step, it is preferable that, but is not limited to, the prepared spray liquid contains starting material particles at a concentration of 10% by mass to 40% by mass. Examples of the binder to be added include carboxymethylcellulose, polyvinylpyrrolidone, polyvinylpyrrolidone and the like. The binder added is preferably prepared at a proportion of 0.05% by mass to 10% by mass relative to the mass of the starting material particles. The sintering environment may be, but is not limited to, in the atmosphere, under vacuum or in an inert gas atmosphere and it is preferable to sinter at a temperature of 600° C. or higher and 1700° C. or lower. When, particularly, spacer particles containing an organic material and the like, a binder and the like are used, sintering may be performed in an atmosphere containing oxygen for the purpose of removing the organic material in the granulated particles. The produced secondary particles may be disintegrated or classified, if necessary.

(Production Method of Three-Dimensional Manufactured Article)

The thus obtained additive manufacturing material may be applied to various types of powder rapid prototyping manufacturing. As a suitable example of the production method of a three-dimensional manufactured article described herein, powder rapid prototyping manufacturing in which selective laser sintering (SLS) is mainly employed is described hereinbelow.

The method for producing a three-dimensional manufactured article described herein generally includes the following steps:

(1) supplying an additive manufacturing material to a manufacturing area of a powder rapid prototyping manufacturing machine;

(2) the supplied additive manufacturing material is uniformly and thinly deposited onto the manufacturing area, thereby forming a thin layer of the additive manufacturing material;

(3) providing, to the formed thin layer of the additive manufacturing material, energizing means for melting the additive manufacturing material, thereby bonding the additive manufacturing material; and (4) supplying fresh additive manufacturing material onto the solidified additive manufacturing material (the above step (1)), and then stacking layers by repeating the steps (2) to (4), thereby obtaining a desired three-dimensional manufactured article.

FIG. 1 shows an example of a schematic view of the lamination manufacturing machine for powder rapid prototyping manufacturing, which includes, as a basic structure, a manufacturing area 10 which is a space in which powder rapid prototyping manufacturing is performed; a stock 12 for retaining the additive manufacturing material; a wiper 11 for assisting supply of the additive manufacturing material to the manufacturing area 10; and a solidification means (energy supply means such as a laser oscillator) 13 for solidifying the additive manufacturing material. The manufacturing area 10 typically has a manufacturing space of which outer circumference is surrounded below a manufacturing surface and has, in the manufacturing space, a lifting table 14 that can move up and down. The lifting table 14 can move downward a predetermined thickness $\Delta t1$ at a time and a desired article is manufactured on the lifting table 14. The stock 12 is disposed beside the manufacturing area 10 and includes a bottom plate (lifting table) that can move up and down by a cylinder or the like in, for example, a retention space of which outer circumference is surrounded. By moving up the bottom plate, a predetermined amount of the additive manufacturing material may be supplied (extruded) onto the manufacturing surface.

1. Supplying the Additive Manufacturing Material

In such a lamination manufacturing machine, an additive manufacturing material is supplied to the manufacturing area 10 while the lifting table 14 is a predetermined thickness $\Delta t1$ below the manufacturing surface, thereby enabling preparation of an additive manufacturing material layer 20 having a predetermined thickness $\Delta t1$.

2. Formation of a Thin Layer of the Additive Manufacturing Material

By driving the wiper 11 on the manufacturing surface upon this occasion, the additive manufacturing material extruded from the stock 12 may be supplied onto the manufacturing area 10 and the upper surface of the additive manufacturing material may be planarized to homogeneously form the additive manufacturing material layer 20.

3. Binding of the Additive Manufacturing Material

Energy may be then applied only to the solidification region corresponding to the slice data of the first layer on, for example, the thus-formed first additive manufacturing material layer 20 via the solidification means 13 and the additive manufacturing material may be melted or sintered so as to have a desired cross-section shape, thereby forming the first powder solidified layer 21.

4. Repetitive Lamination Manufacturing

Thereafter, the additive manufacturing material is again supplied after lowering the lifting table 14 by a predetermined thickness $\Delta t1$ and flattened with the wiper 11, thereby forming the second additive manufacturing material layer 20. A heat source, a solidification composition or the like is then applied only to the solidification region corresponding to the slice data of the second layer on the additive manufacturing material layer 20 and the additive manufacturing material is solidified via the solidification means 13 to form the second powder solidified layer 21. On this occasion, the second powder solidified layer 21 and the first powder solidified layer 21—the lower layer—are unified to form a laminate including up to the second layer.

The lifting table 14 is then lowered by a predetermined thickness $\Delta t1$ to form another additive manufacturing material layer 20, and a heat source, a solidification composition or the like is applied via the solidification means 13 to form a powder solidified layer 21 at a desired site. By repeating the process, a desired three-dimensional manufactured article may be produced.

A means for solidifying the additive manufacturing material to be selected is, for example, a method for ejecting a composition for solidifying the additive manufacturing material by ink-jet, a method for melting/solidifying the additive manufacturing material with heat by a laser or irradiation of an ultraviolet ray if the additive manufacturing material is photocurable so as to conform with the photocurable property thereof. A more preferable means is the method for melting/solidifying the additive manufacturing material, and specifically when the means for solidifying the additive manufacturing material is a laser, a carbon dioxide gas laser or a YAG laser, for example, may be suitably used. When the means for solidifying the additive manufacturing material is ejection of a composition by ink-jet, a composition containing, as an adhesive, polyvinylpyrrolidone, polyvinyl alcohol, polyvinyl butyral, polyacrylic acid, a polyacrylic acid derivative, polyamide or the like, or a composition containing, for example, a polymerization initiator and the like may be used. When a photocurable additive manufacturing material is used, an excimer laser (308 nm), a He—Cd laser (325 nm) or an Ar laser (351 to 346 nm) having an ultraviolet wavelength region, and when a visible light-curable resin is used, an Ar laser (488 nm) or the like may be used. Namely, it is preferable to select an appropriate means for solidifying the additive manufacturing material according to the properties of the additive manufacturing material used.

SLS is a technique for manufacturing a three-dimensional structure by repeating procedures of scanning a laser over a powder layer of deposited additive manufacturing material based on the slice data generated from 3D CAD or the like and melting/solidifying the powder layer into a desired shape cross-section by cross-section (slice data by slice data) to stack the layers. EBM is a technique for manufacturing a three-dimensional structure by selectively melting/solidifying the powder layer with an electron beam based on the slice data similarly prepared from 3D CAD or the like to stack the layers. Both techniques include the step of supplying a starting material of the structure, an additive manufacturing material, at a predetermined manufacturing site. Particularly in SLS and EBM, it is required to repeat a planarization step in which the additive manufacturing material having a thickness corresponding to the thickness of one cross-section is uniformly and thinly deposited throughout the manufacturing area on which the structure is manufactured. In the planarization step of the additive manufacturing material, flowability of the additive manufacturing material is an important parameter and significantly affects the finish of the prepared three-dimensional manufactured article. With regard to this, the additive manufacturing material for powder rapid prototyping manufacturing of the present invention has preferable flowability, and thus may prepare a three-dimensional manufactured article with preferable finish.

Laser metal deposition is, specifically, a technique in which an additive manufacturing material is provided at a desired site of a structure and irradiating with a laser beam to melt/solidify the additive manufacturing material and perform cladding on the site. When, for example, a physical deterioration such as wear is generated in a structure, the procedure allows cladding at the deteriorated site and the like by supplying to the deteriorated site an additive manufacturing material which is a material that composes the structure or a reinforcing material and melting/solidifying the additive manufacturing material.

The above embodiments may be modified as follows.

The additive manufacturing material and the secondary particles that form the additive manufacturing material and further primary particles that form the secondary particles may contain a component other than the main component such as inevitable impurities or additives. Namely, the purity is not particularly limited. However, for an application of, for example, forming a three-dimensional manufactured article having high functionality, it is preferable to avoid inclusion of an unintended substance (element) and it is preferable that the additive manufacturing material has high purity. From such viewpoints, it is preferable that the secondary particles and the primary particles that form the secondary particles have high purities. For example, the purity is preferably 95% by mass or more, further 99% by mass or more, more preferably 99.9% by mass or more such as 99.99% by mass or more.

The additive manufacturing material may contain another element (for example, for a ceramic, a transition metal element or an element such as Na, K and Rb) for the purpose of, for example, adjusting colour tone of a three-dimensional manufactured article to be formed or may contain another element for the purpose of increasing the functionality. Some of the elements that form the additive manufacturing material may be contained in the form of ions, complexes and the like.

In the additive manufacturing material, the first powder is powder formed from particles having the form of secondary particles in which primary particles having voids are three-dimensionally bound, the additive manufacturing material may contain particles having the form other than secondary particles. However, it is preferable that the content of the particles other than secondary particles is as low as possible. The reasons for this are, firstly, the present invention is based on the finding that by using an additive manufacturing material that is formed from secondary particles in which primary particles are three-dimensionally bound through voids for powder rapid prototyping manufacturing, manufactured articles that are denser than in the past may be manufactured. Therefore, when the ratio of the secondary particles in the specific form is increased relative to the total amount of the additive manufacturing material, the effect of the present invention is increased. In other words, when the ratio of the secondary particles in the specific form is deceased relative to the total amount of the additive manufacturing material, the effect of the present invention is less exhibited.

The secondary particles in the specific form of the present invention exhibit another preferable effect based on the following idea. For example, when the additive manufacturing material is prepared by merely mixing more than one type of single particles such as metal particles and ceramic particles, due to the difference in the specific gravity, particles formed from a material having a higher specific gravity tend to go below and particles having a lower specific gravity tend to go above, thereby generating a deviation of components in the additive manufacturing material. In contrast, the secondary particles in the specific form of the present invention have a uniform specific gravity and thus a deviation of components in the additive manufacturing material hardly occurs and thus the produced three-dimensional manufactured article has improved finish even when first powder is formed from cermet particles in which metal particles and ceramic particles are mixed or first powder is formed by mixing more than one type of material particles. From this point of view, it is preferable that the ratio of the secondary particles in the specific form relative to the total amount of the additive manufacturing material is high. Therefore, the lower limit of the content of the secondary particles relative to the additive manufacturing material is preferably 90% by weight and more preferably 95% by weight. The upper limit is generally 98% by weight and may be appropriately adjusted by mixing a component other than the secondary particles such as an additive to an extent that does not deteriorate the effect of the present invention.

EXAMPLES

Examples pertaining to the present invention are hereinafter described. However, it is not intended that the present invention is limited to those described in Examples below.

As first powder, granulated powder was prepared which was formed from cermet (WC/12 Co) obtained by adding cobalt (Co) powder so as to be 12% by mass to powder of tungsten carbide (WC). The granulated powder had an average particle diameter adjusted to 30 μm and had a bulk density of 5.1 g/cm$^3$.

As second powder, powder of Stellite (Stellite No. 6) was prepared. The powder had an average particle diameter adjusted to 9 μm and had a bulk density of 4.0 g/cm$^3$.

The prepared cermet powder and metal powder were stirred and mixed at compositions indicated in Table 1 to prepare additive manufacturing materials of Examples 1 to 8.

The average particle diameter of the thus prepared powders was the particle diameter at 50% of the cumulative value ($D_{50}$) in the particle size distribution based on the volume as measured on a laser diffraction/scattering particle size analyser (produced by Horiba Ltd., LA-300). The cermet powder was classified (sieved), if necessary, to adjust the average particle diameter to 30 μm.

The bulk density was measured according to "Metallic powders-Determination of apparent density" under JIS Z2504:2012. Specifically, a container of a predetermined volume was filled with powder free-flowing from an orifice of a diameter of 2.5 mm, and the mass of the powder was measured to calculate the bulk density. The bulk density was measured with JIS bulk specific gravity analyser for metal powder (produced by Tsutsui Scientific Instruments Co., Ltd.).

[Select Laser Melting (SLM)]

The prepared additive manufacturing materials were subjected to lamination manufacturing by a powder rapid prototyping manufacturing process, select laser melting, thereby obtaining three-dimensional manufactured articles. For lamination manufacturing, a laser sintering powder rapid prototyping manufacturing system (produced by SLM Solutions Group AG, SLM125HL) was used. Specifically, each additive manufacturing material was supplied to the manufacturing area at a thickness of 50 μm per layer and the additive manufacturing material was planarized with a wiper attached to the machine to form a deposited layer (thin layer) of the additive manufacturing material. The thin layer of the additive manufacturing material was two-dimensionally irradiated with a fibre laser, thereby forming a layer-shaped manufactured article. The step of supplying the additive manufacturing material and planarization and the step of laser irradiation were repeated to obtain a three-dimensional manufactured article (design: 20 layers (1 mm)). The process conditions were as follows: the laser focus was about Ø 150 μm, the laser output was 100 W, the laser scanning speed was 300 mm/sec, the temperature environment was normal temperature and the atmosphere surrounding the additive manufacturing material was Ar gas.

[Porosity]

As an index for evaluating the finish of prepared three-dimensional manufactured articles, the three-dimensional manufactured articles were measured for porosity. The porosity determined was the value measured by image analysis on polished cross-sections sectioned in the direction of manufacturing (thickness direction) of each three-dimensional manufactured article. Specifically, an image of the cross-section of a three-dimensional manufactured article was obtained, binarization was performed with an image analysis software to separate the cross-section of the three-dimensional manufactured article to a pore section and a solid phase section (manufactured section of the manufactured article), and the proportion of the area of the pore section in the total cross-sectional area was calculated as porosity.

Figure 2A:
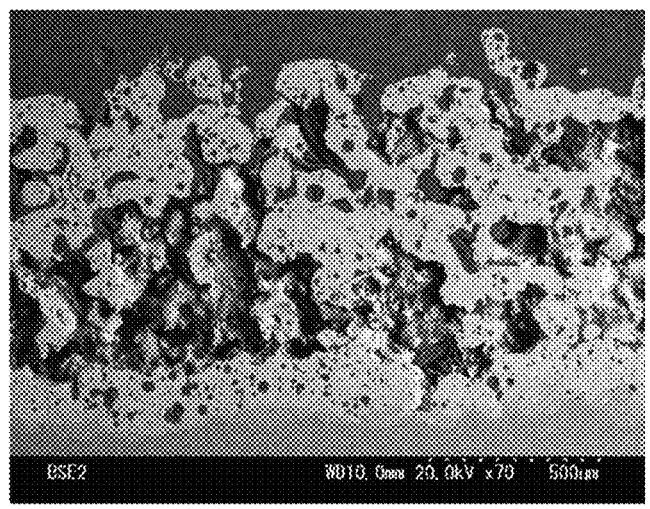
FIG. 2 shows cross-sectional SEM images of manufactured articles according to (a) Comparative Example and (b) Example.
Figure 2B:
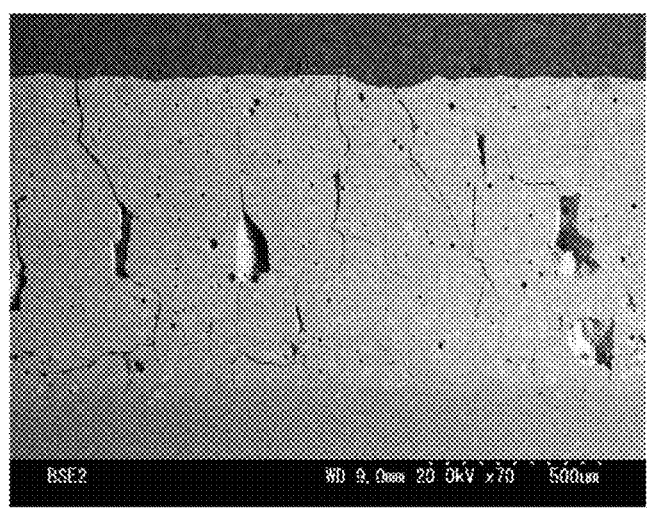

The porosity was measured with an observation image (which may suitably be any of a secondary electron image, a compositional image or an X-ray image) from a scanning electron microscope (SEM; produced by Hitachi High-Technologies Corporation, S-3000N). For reference, SEM images of manufactured articles of Example 1 and Example 5 are shown in FIGS. 2(a) and (b) in sequence. The image analysis software used was Image-Pro (produced by Media Cybernetics, Inc.). The results of measurements of the porosity of three-dimensional manufactured articles are shown under "porosity" in Table 1.

[Hardness]

Each manufactured article was measured on the basis of Vickers hardness test method under JIS Z2244:2009. Specifically, by using a micro hardness tester (produced by Shimadzu Corporation, HMV-1), the surface of the manufactured article was indented with a diamond indenter having a facing angle of 136° at a testing force of 1.96 N and from the resulting indentation, Vickers hardness (Hv 0.2) was calculated. The results are indicated under "Hardness" in Table 1.

[Manufacturing Thickness Per Layer]

As an index for evaluating manufacturing accuracy and manufacturing speed, the manufacturing thickness per scan of laser (namely per layer) was determined. The manufacturing thickness per layer was the value calculated by measuring the total thickness of the obtained manufactured article and dividing the same by the number of stacked layers (the number of laser scans in the thickness direction). The total thickness of the manufactured article was obtained by measuring the thickness of the polished cross-section of the manufactured article sectioned in the manufacturing direction (thickness direction) during SEM observation performed during measurement of the porosity described above. The total thickness of the manufactured article was obtained by measuring at 3 or more points per visual field for 3 or more visual fields of SEM observation images per manufactured article and averaging the results. The results are indicated under "Thickness per layer" in Table 1.

[Table 1]

TABLE 1

| | First powder (WC/12Co) | | | Second powder (Stellite) | | | Manufactured article | | |
| --- | --- | --- | --- | --- | --- | --- | --- | --- | --- |
| Example | $D_{50}$ (μm) | Bulk density (g/cm$^3$) | Composition (% by mass) | $D_{50}$ (μm) | Bulk density (g/cm$^3$) | Composition (% by mass) | Porosity (%) | Hardness Hv 0.2 | Thickness per layer (μm) |
| 1 | 30 | 5.1 | 100 | 9 | 4.0 | 0 | 15 | 1000 | 20 |
| 2 | 30 | 5.1 | 90 | 9 | 4.0 | 10 | 10 | 1000 | 30 |
| 3 | 30 | 5.1 | 85 | 9 | 4.0 | 15 | 8 | 1100 | 37 |
| 4 | 30 | 5.1 | 70 | 9 | 4.0 | 30 | 4 | 1200 | 40 |
| 5 | 30 | 5.1 | 50 | 9 | 4.0 | 50 | 1 | 1300 | 45 |
| 6 | 30 | 5.1 | 30 | 9 | 4.0 | 70 | 0.8 | 1200 | 47 |
| 7 | 30 | 5.1 | 15 | 9 | 4.0 | 85 | 0.5 | 1000 | 48 |
| 8 | 30 | 5.1 | 10 | 9 | 4.0 | 90 | 0.25 | 800 | 48 |

[Evaluation]

It was found that when the additive manufacturing material of Example 1 which contained no metal powder (in this example, Stellite 6) added to cermet powder (in this example, WC/12 Co) was used, only a manufactured article having a porosity as high as 15% and having a porous texture as shown in FIG. 2(a) was obtained. It was also found that by configuring the additive manufacturing materials by adding metal powder to cermet powder as shown in Examples 2 to 8, the porosity of manufactured articles could be reduced. When the proportion of metal powder in the additive manufacturing material was increased, the porosity of the obtained manufactured articles was gradually reduced. It was demonstrated that when the proportion of metal powder exceeded 10% by mass, the porosity of manufactured articles was less than 10% and dense manufactured articles could be manufactured even when additive manufacturing materials containing ceramic components (as cermet) were used.

It was also demonstrated that when the proportion of metal powder in the additive manufacturing material was increased, the thickness per layer was also gradually increased. It was believed that metal powder was softened and melted starting at a relatively low temperature during powder rapid prototyping manufacturing of the additive manufacturing materials and served as a binder for the cermet powder as well as contributed to prevention of scattering of the cermet powder and the metal powder per se.

As described above, when the proportion of metal powder in the additive manufacturing material is increased, the porosity of the manufactured articles can be easily decreased, similar to the case wherein an additive manufacturing material containing a metal material is used. However, it was found that the hardness of the manufactured articles increased up to about 50% by mass while the proportion of the metal powder was increased from 0% by mass, while the hardness decreased when the proportion of the metal powder was further increased. It is believed that this was because an effect of an increase of the binder preferably worked until about 50% by mass of the metal powder proportion, while the presence of excess metal softened the texture of the manufactured articles. For example, when the proportion of the metal powder reached about 90% by mass, the hardness of the manufactured article significantly depended on the properties of the metal material and an advantage of using the cermet was eliminated, and thus it was not preferable.

The present invention has been described hereinabove by way of preferable embodiments. However, it is apparent that the descriptions are not limitation and various modifications are possible. Although not indicated specifically, a person skilled in the art can sufficiently understand that when granulated particles containing only ceramic powder was used as first powder, the additive manufacturing material can be obtained similarly to the above. It can also be understood that a manufactured article could be manufactured by powder rapid prototyping manufacturing with such an additive manufacturing material. A person skilled in the art can understand that the nature and advantages of the technique described herein could be attained by various embodiment.

REFERENCE SIGNS LIST

10 Manufacturing area
11 Wiper
12 Stock
13 Means for solidifying the additive manufacturing material
14 Lifting table
20 Additive manufacturing material layer
21 Powder solidified layer

The invention claimed is:

1. A method for producing a three-dimensional manufactured article, comprising:
   (a) preparing an additive manufacturing material comprising:
      (i) a first powder that is a granulated powder containing a ceramic; and
      (ii) a second powder containing a metal,
      wherein primary particles of the first powder are three-dimensionally bound together to form granulated particles with voids between the primary particles, and the first powder and the second powder are mixed and a proportion of the second powder relative to a sum of the first powder and the second powder is above 10% by mass and less than 90% by mass; and
   (b) producing a three-dimensional manufactured article by using the additive manufacturing material, wherein the three-dimensional manufactured article has a porosity of less than or equal to 10%, the producing step comprising:
      (i) supplying the additive manufacturing material uniformly onto a manufacturing area to form a thin layer of the additive manufacturing material;
      (ii) providing, to the formed thin layer of the additive manufacturing material, energizing means for melting the additive manufacturing material, to bond the additive manufacturing material; and
      (iii) repeating the supplying step and the providing step to obtain a desired three-dimensional manufactured article, wherein the first powder has an average particle diameter of 1 μm or more and 100 μm or less, and wherein the second powder has an average particle diameter of 0.1 μm or more and 100 μm or less.

* * * * *